(12) United States Patent
Falls

(10) Patent No.: US 8,875,132 B2
(45) Date of Patent: Oct. 28, 2014

(54) METHOD AND APPARATUS FOR IMPLEMENTING VIRTUAL PROXY TO SUPPORT HETEROGENEOUS SYSTEMS MANAGEMENT

(75) Inventor: Patrick Terence Falls, Newbury (GB)

(73) Assignee: Neverfail Group Limited (GB)

( * ) Notice: Subject to any disclaimer, the term of this patent is extended or adjusted under 35 U.S.C. 154(b) by 466 days.

(21) Appl. No.: 13/149,884

(22) Filed: May 31, 2011

(65) Prior Publication Data

US 2012/0311572 A1  Dec. 6, 2012

(51) Int. Cl.
*G06F 9/455* (2006.01)
*G06F 9/54* (2006.01)

(52) U.S. Cl.
CPC *G06F 9/455* (2013.01); *G06F 9/54* (2013.01); *G06F 9/45533* (2013.01)
USPC .............................................. 718/1; 709/224

(58) Field of Classification Search
None
See application file for complete search history.

(56) References Cited

U.S. PATENT DOCUMENTS 7,093,288 B1 *  8/2006  Hydrie et al. ................... 726/13
2012/0066681 A1 *  3/2012  Levy et al. ........................ 718/1

FOREIGN PATENT DOCUMENTS

TW  201120751 A  *  6/2011

* cited by examiner

*Primary Examiner* — Kenneth Tang
(74) *Attorney, Agent, or Firm* — Taylor Russell & Russell, P.C.

(57) ABSTRACT

A computer system apparatus includes a first virtual machine hosted by a first physical machine. A target machine is communicatively coupled to the first virtual machine. The target machine is one of another physical machine and another virtual machine. The first virtual machine serves as a virtual proxy for the target machine.

16 Claims, 6 Drawing Sheets

METHOD AND APPARATUS FOR IMPLEMENTING VIRTUAL PROXY TO SUPPORT HETEROGENEOUS SYSTEMS MANAGEMENT

BACKGROUND

Computer systems have traditionally consisted of physical machines. Virtual machines are software simulations of the hardware components of a physical machine. Although a physical machine host is required for implementation of one or more virtual machines, virtualization permits consolidation of computing resources otherwise distributed across multiple physical machines to fewer or even a single host physical machine. The consolidation enables reductions in space, power, cooling, and hardware requirements.

A virtual machine can be moved between physical machines to balance workloads, utilize faster physical machines, or to recover from a hardware fault on a physical machine. The benefits of virtualization have resulted in the development of virtual machine management tools.

One limitation of prior art virtual machine management tools is a lack of support for managing physical machines. Another limitation is the lack of variety of virtualization platforms that are supported on a single virtual machine management tool.

Although virtualization offers many positive benefits, there are still applications for which a physical machine is needed. The virtual machine management tool is incapable of managing such a physical machine. Over time, an organization is also likely to have legacy or other reasons that require maintaining virtual machines that are not supported by the virtual machine management tool.

While the use of virtualization can lead to reductions in the cost of deploying and managing computers, the inability to use the same management tool to manage all of the individual machines forming the computer system as a whole tends to increase the cost and complexity of managing the system as a whole.

SUMMARY

A computer system apparatus includes a first virtual machine hosted by a first physical machine. A target machine is communicatively coupled to the first virtual machine. The target machine is one of another physical machine and another virtual machine. The first virtual machine serves as a virtual proxy for the target machine.

In one embodiment, the virtual proxy communicates a response to the requester without forwarding the request to the target machine for execution. In another embodiment, the virtual proxy communicates the request to the target machine for execution. The virtual proxy then communicates a response from the target machine to the requester.

In one embodiment, the virtual proxy transforms the request to a target machine compatible request prior to communicating the request to the target machine. In another embodiment, the target machine transforms the request to a target machine compatible request prior to attempting to execute the request.

In various embodiments, the target machine may incorporate packet-filtering software configured to accept network requests only from the network address (e.g., Internet Protocol address) associated with the management console or the virtual proxy.

Other features and advantages of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Figure 1:
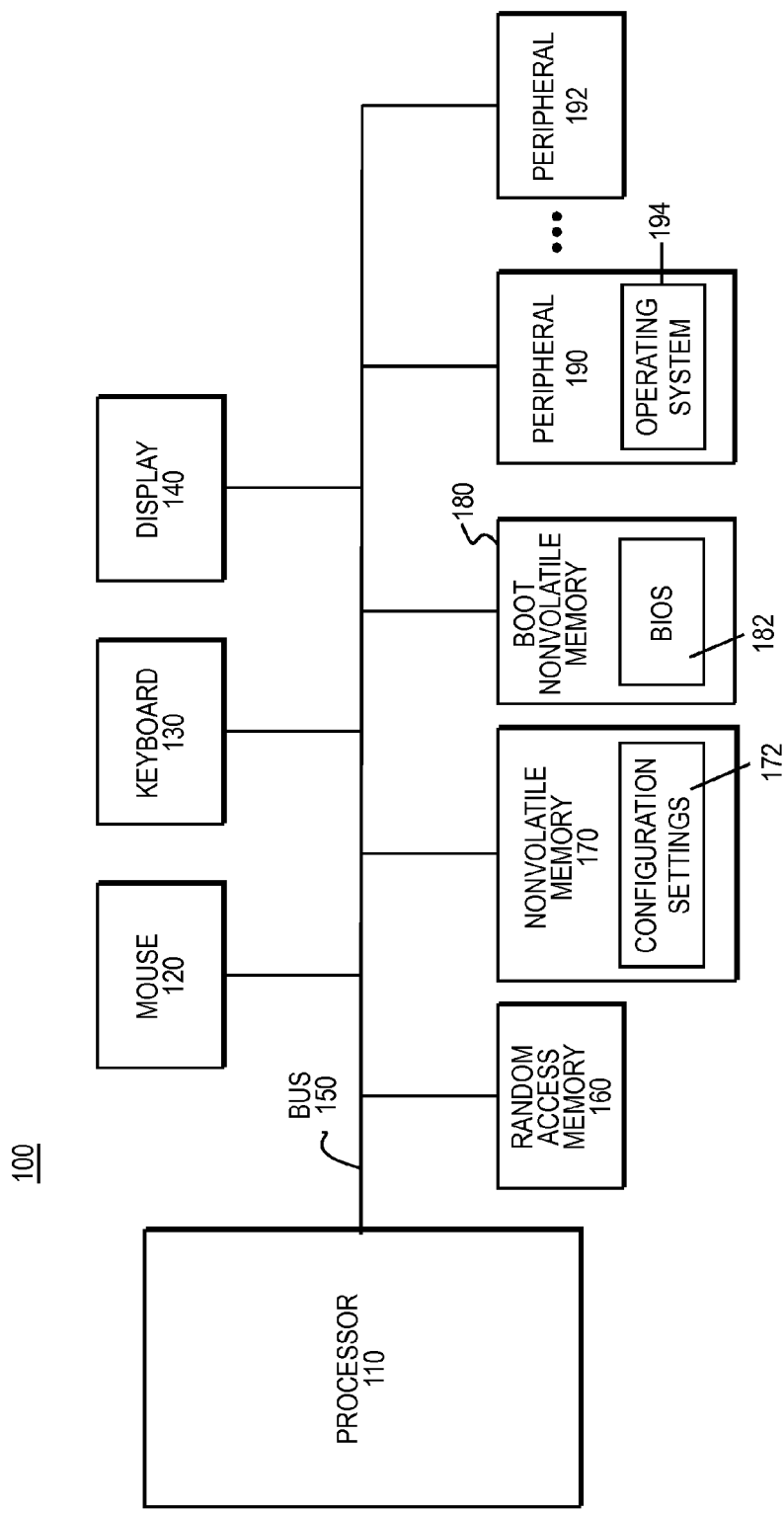
FIG. 1 illustrates one embodiment of physical machine computer architecture.

FIG. 1 illustrates one embodiment of a physical machine computer architecture. Computer 100 includes processor 110. Input devices such as mouse 120 and keyboard 130 permit the user to input data to client computer 100. Information generated by the processor is provided to an output device such as display 140. Computer 100 includes random access memory (RAM) 160 used by the processor during program execution.

RAM 160 is typically a volatile memory and does not retain its contents once power is removed from the computer system. Computer 100 includes nonvolatile memory 170 for storing configuration settings 172 even when the computer is powered down.

Parameter information that identifies specific features of the input/output devices is typically stored in nonvolatile memory 170. For example, parameter information might describe the number of disk drives, disk drive type, number of heads, tracks, amount of system RAM, etc. as well as the sequence in which peripherals are accessed when attempting to boot the computer (peripheral boot sequence). Typically, nonvolatile memory 170 is a semiconductor-based memory. Various types of nonvolatile media including electrically erasable programmable read only memory (EEPROM), flash electrically re-writable memory, and battery-backed complementary metal oxide semiconductor (CMOS) are available.

The computer also has one or more peripherals 190, 192 such as a floppy drive, a hard drive, or an optical drive that supports nonvolatile storage. Compact disks (CDs) and Digital Video Disks (DVDs) are examples of media used with optical drives.

Mouse 120, keyboard 130, display 140, RAM 160, nonvolatile memory 170, and boot nonvolatile memory 180 are communicatively coupled to processor 110 through one or more buses such as bus 150. There are many possible variations for the number and type of busses and peripheral devices.

Virtual machines are software simulations of the hardware components of a physical machine. One or more virtual machines may reside on a host physical machine. The host physical machine has an operating system referred to as the host operating system. Any operating system implemented by the virtual machine is referred to as a guest operating system.

Virtualization permits consolidation of computing resources otherwise distributed across multiple physical machines to fewer or even a single host physical machine. The consolidation enables reductions in space, power, cooling, and hardware requirements.

Figure 2:
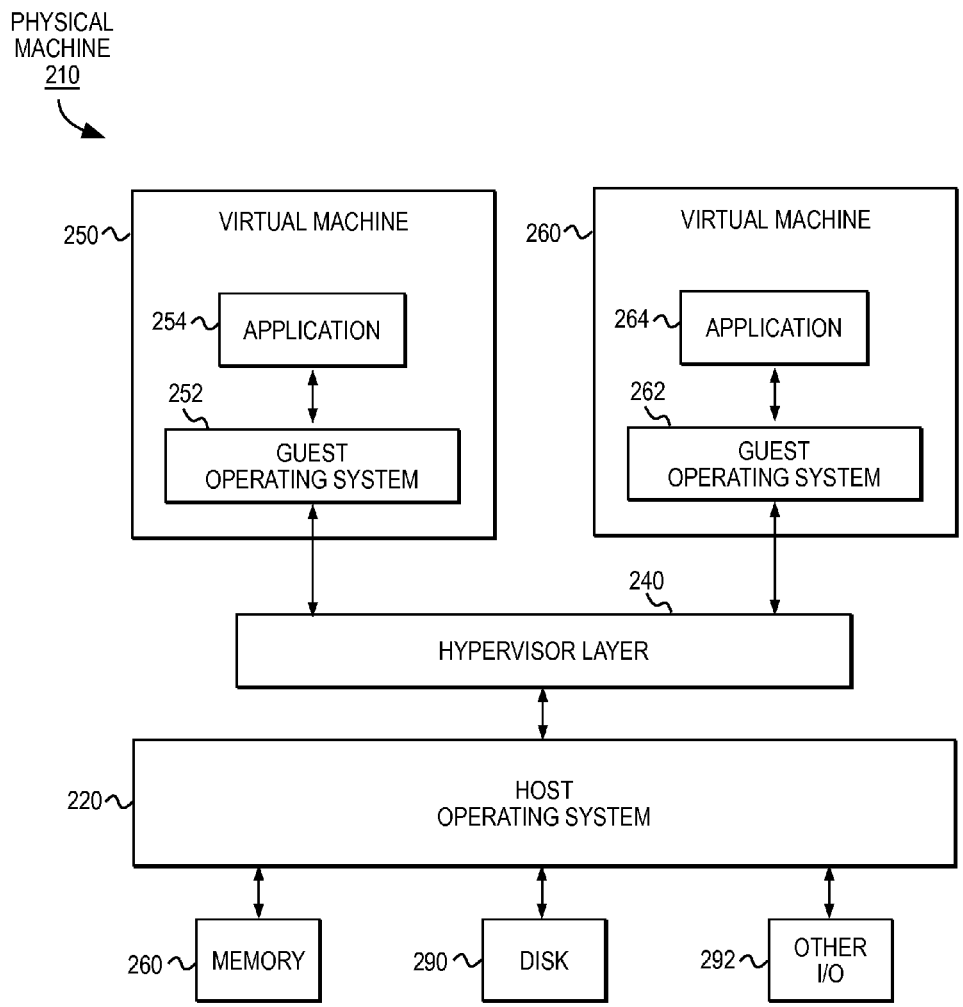
FIG. 2 illustrates one embodiment of virtual machines hosted by a physical machine.

FIG. 2 illustrates one embodiment of a host physical machine 210 hosting one or more virtual machines 250, 260. The host physical machine has a host operating system 220 that allocates and provides access to system resources such as memory 260, disk storage 290, and other peripherals 292 as needed.

When executed, a virtual machine emulates a physical machine. The virtual machine contains its own virtual processor and software implementation of various peripherals. Although a physical machine is ultimately required to host a virtual machine, a single physical machine may host many virtual machines.

Each virtual machine includes its own operating system. The virtual machine operating system is referred to as a guest operating system 252, 262. The virtual machine may also execute one or more applications 254, 264. In the illustrated embodiment, the host physical machine is executing a virtualization layer identified as hypervisor 240. Hypervisor 240 traps input/output ("I/O") requests of the virtual machine and emulates peripherals when responding to such requests. The virtualization layer abstracts the host memory and other peripherals such that the guest operating system is unaware of the host operating system.

Various virtualization techniques include para-virtualization, hardware-assisted virtualization, and full software virtualization. These vary primarily in the level of performance and the cost of achieving such an objective.

Para-virtualization entails modification of the guest operating system to recognize that virtualization is employed and to facilitate more efficient planning and usage of the host resources. The required modifications generally preclude the ability to utilize a commercially available off-the-shelf guest operating system.

Hardware-assisted virtualization refers to use of host resources to replace some of the functionality of the virtualization layer. Hardware assistance can increase performance of both the host and the virtual machine, however, the virtualization layer must be designed to utilize hardware assistance. For example, some processors include instructions or extensions to instructions for supporting virtualization.

Virtualization offers the ability to execute applications designed for a hardware platform or operating system different from that of the host machine. The virtual machine can execute legacy applications or software designed for an instruction set that is otherwise incompatible with that of the host physical machine. Thus the virtual machines can offer a route to compatibility with legacy applications.

Virtualization enables consolidation of computing resources and higher utilization of physical machines. In particular, an information technology design paradigm of "one application per physical machine" that was based upon preserving isolation can be replaced with "multiple applications per physical machine" without foregoing the objective of preserving isolation between machines and applications. Such a consolidation of resources can result in reductions of required space, reduced power requirements, reduced cooling requirements, and a lower cost of maintenance and ownership of the system as a whole.

Virtualization provides isolation between virtual machines hosted by the same physical machine. Applications executing on one virtual machine are isolated from applications executing on another virtual machine. One benefit is the elimination of intra-application compatibility issues that arise when applications share the same operating system on a single physical or virtual machine. The virtual machine paradigm facilitates encapsulation or treatment of the virtual machine and its applications as a self-contained package fully decoupled from the hardware of the host physical machine. Thus virtualization enables the virtual machines to share the physical resources of the physical machine while offering isolation that applications would have if executed on individual physical machines. A virtual machine can be moved between physical machines to balance workloads, utilize faster physical machines, or to recover from a hardware fault on the physical machine. Isolation provides enhanced security benefits and robustness for fault management.

The benefits of virtualization have resulted in the development of virtual machine management tools such as VMware Inc.'s vCenter Server or Microsoft, Inc.'s System Center Virtual Machine Manager. VMware's vCenter Server facilitates virtualization of servers and management of the virtualized servers using VMware's ESX hypervisor. (VMware, Inc. is a Delaware corporation having a principal place of business in Palo Alto, Calif.) Microsoft's System Center Virtual Machine Manager is primarily focused on supporting machines running Microsoft's Hyper-V hypervisor. (Microsoft, Inc. is a corporation having a principal place of business in Redmond, Wash.) These virtualization tools, combined with the advantages of virtualization, can simplify the process of deploying and managing new servers.

Virtualization may enable capital and maintenance cost savings from the use of hosting machines at a third-party location. However, additional costs might be incurred to supply sufficient additional wide-area network bandwidth between the end users of the organization and the hosted computer. While many prior art methods exist to optimize this wide-area network bandwidth, it will not always be possible to integrate these easily with the virtual management software.

Although virtualization offers many positive benefits, there are still applications for which a physical machine is needed for performance reasons or to meet other objectives. Not all computers can be readily virtualized due to legacy issues, transaction processing, or input/output constraints. For example, a physical machine may be more appropriate for I/O intensive activities or necessitated by security concerns.

One drawback of typical virtual machine system management tools is that they are limited to managing virtual machines with supported hypervisors. Another drawback is that the virtual machine system management tools typically do not provide support for managing physical machines. While the use of virtualization can lead to reductions in the cost of deploying and managing computers, the inability to use the same management tool to manage all of the individual machines forming the computer system as a whole tends to increase the cost and complexity of managing the system as a whole.

Computer systems often reflect a heterogeneous system environment composed of a mix of physical and virtual machines of different operating systems that cannot be managed by the same virtual machine system management tool.

Consider, for example, an organization that starts with a group of physical servers with management software provided by vendor X that only supports physical machines. Some of these physical machines are replaced with virtual machines from vendor A thereby reducing hardware costs. The organization then replaces some of the resulting mix of physical and virtual machines with virtual machines from vendor B because vendor B offers some functionality or costs advantages over vendor A. The organization then decides to take advantage of third-party hosting to have vendor C host some of the mix of physical machines and virtual machines at vendor C's hosted location. The result is a heterogeneous mix of physical machines and virtual machines provided by vendors A and B and some hosted machines by vendor C.

Vendors A, B and C all provide management software, but typically none of these is compatible with the mix of machines to be managed. The organization is then faced with using some mix of management software from vendors X, A, B, and C and possibly with the need to use different software from vendor Y that supports a wider subset of its servers. The organization might have realized reductions in required space, reduced power requirements, and reduced cooling requirements as a result of virtualization. However, the organization might now experience a higher cost of maintenance and ownership of the system as a whole due to the inability to use a single system management tool for the system as a whole.

One approach to reducing the cost and the complexity of management is through the introduction of virtual proxies to serve as management tool compatible proxies for now-proxied incompatible other physical or virtual machines. Virtual machine management software is selected from one vendor, e.g. vendor A, and virtual proxies are introduced as proxies to handle the physical machines and virtual machines not directly supported by A. A virtual proxy is a virtual machine executing virtual proxy code to enable the virtual proxy to serve as a proxy for a target machine. A single virtual machine can serve as a virtual proxy for multiple target machines. In one embodiment, the virtual machine executes an instance of virtual proxy code for each target machine that is being proxied such that the virtual machine serves as a virtual proxy for each of a plurality of target machines. Thus a single virtual machine may support multiple virtual proxies. Virtual proxy code in conjunction with configuration settings (e.g., network address of the target machine) configure the virtual machine to serve as a virtual proxy for a specific target machine. The target machine may be another virtual machine or a physical machine. The virtual proxy and target machine are communicatively coupled by a communications network.

Figure 3:
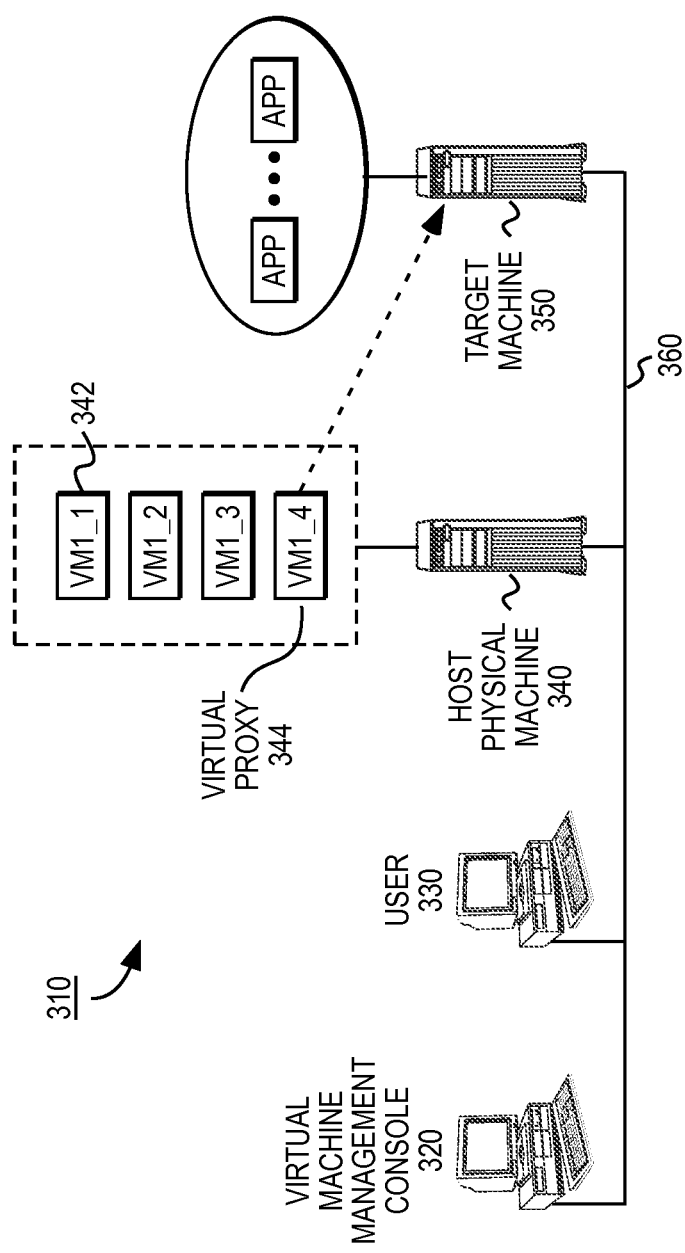
FIG. 3 illustrates one embodiment of computer system infrastructure employing a virtual proxy for a physical machine.

FIG. 3 illustrates one embodiment of computer system infrastructure employing a virtual proxy to support the use of an otherwise unsupported target machine using virtualization management tools. Computer system infrastructure 310 employs virtual machine management console 320 for managing one or more virtual machines 342 executing on a host physical machine 340. The nomenclature "VMx_y" identifies virtual machine y on host x.

At least one of the virtual machines is configured to run a virtual proxy 344. The virtual proxy serves as a proxy for a proxied target machine 350. The target machine may be another virtual machine ("target virtual machine") or a physical machine ("target physical machine"). In one embodiment a target virtual machine is hosted on the same physical host as the virtual machine serving as the virtual proxy. In another embodiment, a target virtual machine is hosted on a physical machine distinct from the physical machine hosting the virtual machine that serves as a virtual proxy. If the target machine is a physical machine, the target machine is not the host of the virtual proxy. The physical machines, virtual machine hosting the virtual proxy, target machine, virtual machine management console, and user console 330 are communicatively coupled by a network such as an Ethernet network 360.

The virtual proxy 344 serves primarily as an intermediary between other machines (e.g., virtual machine management console 320, users 330, or other virtual machines 342) and the proxied target machine 350. From the perspective of these other machines, the virtual proxy 344 appears to be the target machine 350. In order to accomplish this feat, virtual proxy 344 operates to intercept, possibly act upon, or filter and route requests to target machine 350 and to route responses from the target machine 350 or the virtual proxy 344 back to the requester. In one embodiment, the virtual proxy and virtualization software on the host physical machine 340 effectively conceal the presence of target machine 350 from virtual machine management console 320, other networked users 330, and other virtual machines 342 or other physical machines. Target machine 350 is visible to virtual machine management 320 for purposes of linking the virtual proxy 344 to the target machine 350 and defining the proxy behavior.

Figure 4:
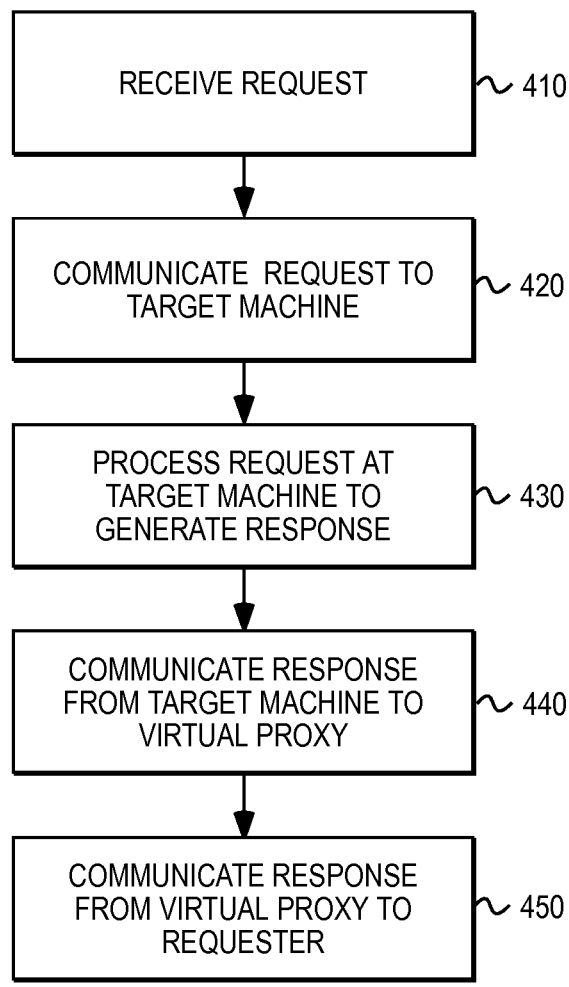
FIG. 4 illustrates one embodiment of a virtual proxy process.

FIG. 4 illustrates one embodiment of a virtual proxy process. The virtual proxy receives a request from a requester in step 410. This request may originate from another virtual machine on the same host, the host, or other physical machine or virtual machine on the local network. In other embodiments, the request may originate from another physical or virtual machine communicatively coupled to the local network. For example, the request may originate from a requesting machine on a wide-area network coupled to the local area network or the request may originate from another coupled network such as the Internet.

The virtual proxy communicates the request to the target machine in step 420. The request is processed at the target machine to generate a response in step 430. The response is communicated from the proxied target machine to the virtual proxy in step 440. In step 450, the virtual proxy communicates the response to the requester.

In some cases, the virtual proxy may be able to respond on behalf of the proxied target machine without the assistance of the target machine. Authentication and cache features, for example, are situations in which the virtual proxy might generate a response without burdening the associated target machine.

Figure 5:
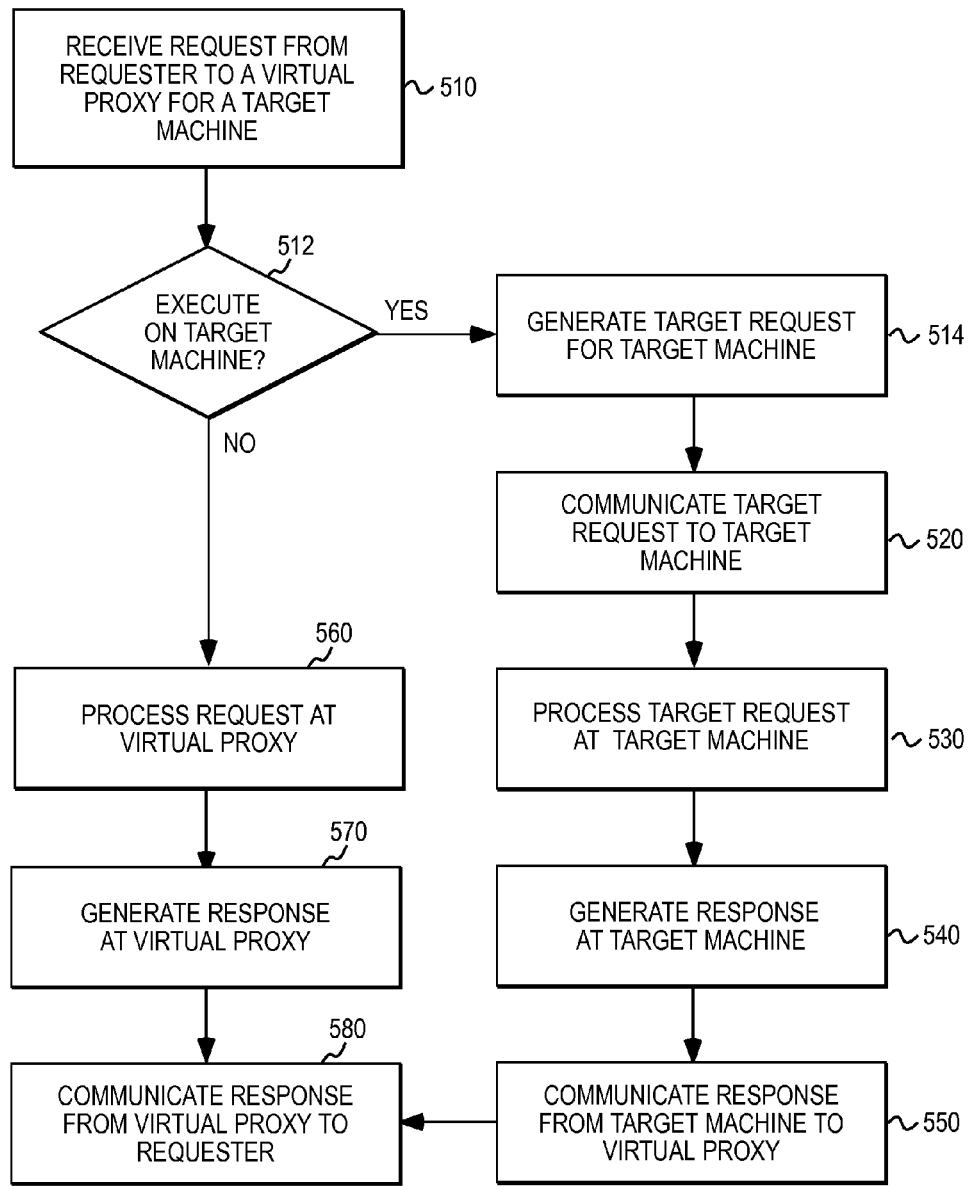
FIG. 5 illustrates another embodiment of a virtual proxy process.

FIG. 5 illustrates another embodiment of a virtual proxy process. The virtual proxy receives a request from a requester in step 510. The virtual proxy is hosted on a virtual machine that is itself hosted on a host physical machine. The virtual proxy is a proxy for a target machine (the proxied machine). The target machine can be either another virtual machine or a physical machine.

The virtual proxy may perform authentication and reject requests without the involvement of the target machine. In one embodiment, the virtual proxy may have cached responses in anticipation of receiving additional similar requests. For example, information that has been recently requested or information that is requested on a recurring basis may be cached on the virtual proxy. In such cases, the virtual proxy may be capable of responding to the request without burdening the target machine. The virtual proxy determines whether the request needs to be executed on the target machine in step 512.

If handling by the target machine is not required, the request can be processed by the virtual proxy at step 560. The virtual proxy generates a response at step 570. The response is communicated from the virtual proxy to the requester at step 580.

Steps 560-580 assume that the security protocol authorizes responding to the requester. In the event that a response is not authorized for a requester, the process may terminate at step 570 without communicating any response to the requester.

In the event that a determination is made in step 512 that the received request needs to be handled by the target machine, processing continues with step 514 to generate a target request for the target machine. Generation of the target request may entail modification of packet headers to forward the request to the target machine. In various embodiments, this may be accomplished via network address translation, internet protocol masquerading, or port address translation. Generation of the target request at the virtual proxy may also entail modifying the request itself to ensure compatibility with the target machine.

The target request and received request may be substantially the same in many cases. In various cases, however, the received request must be transformed before processing by the target machine. For example the received request may be hypervisor- or platform-specific. In such cases the received request must be transformed into an appropriate compatible request suitable for execution by the target machine. In one embodiment, the virtual proxy forwards the request to the target machine where a target machine component (see FIG. 6) transforms the request as necessary before allowing the target machine to act upon the request. In another embodiment, the virtual proxy transforms the request before forwarding to the target machine. In yet another embodiment, the virtual proxy and a target machine component on the target machine co-operate to modify the request for target machine compatibility to enable the target machine to act upon it.

The target request is communicated to the target machine in step 520. In one embodiment, information on the received requests is maintained on the target machine for reporting purposes. The target request is processed by the target machine in step 530. A response is generated at the target machine in step 540. In one embodiment, information on the generated response is maintained on the target machine for reporting purposes.

In one embodiment, the response may be communicated directly from the target machine to the requester. However, in a preferred embodiment the response is communicated from the target machine to the virtual proxy at step 550. The virtual proxy then communicates the response to the requester at step 580. If the virtual proxy is providing a cache function to alleviate demands on the target machine, then the response may be cached on the virtual proxy as appropriate.

The virtual proxy enables utilization of a common virtual machine management tool to manage an information technology infrastructure that includes physical machines or otherwise incompatible virtual machines for legacy, performance, cost, or other reasons. The common management tool helps to reduce complexity, personnel costs and software costs.

The virtual proxy enables management of physical machines that are otherwise incompatible with the virtual machine management tool. The virtual proxy also enables management of virtual machines that are not compatible with the virtual machine management tool. This latter situation can occur when specific operations requested by the virtual machine management tool cannot be performed on a virtual machine. Incompatibilities with the hypervisor being used by the virtual machine or the operating system or software deployed on the virtual machine can prevent virtual machine management tool requests from executing successfully. The virtual proxy is introduced to synthesize compatibility between the target machine and the virtual machine management tool.

Processor executable instructions suitable for synthesizing apparent compatibility between the target machine and the virtual machine management tool are provided for the virtual proxy and possibly the target machine. In various embodiments, the processor executable instructions may be implemented as software or firmware on the virtual machine serving as the proxy and the target machine.

Figure 6:
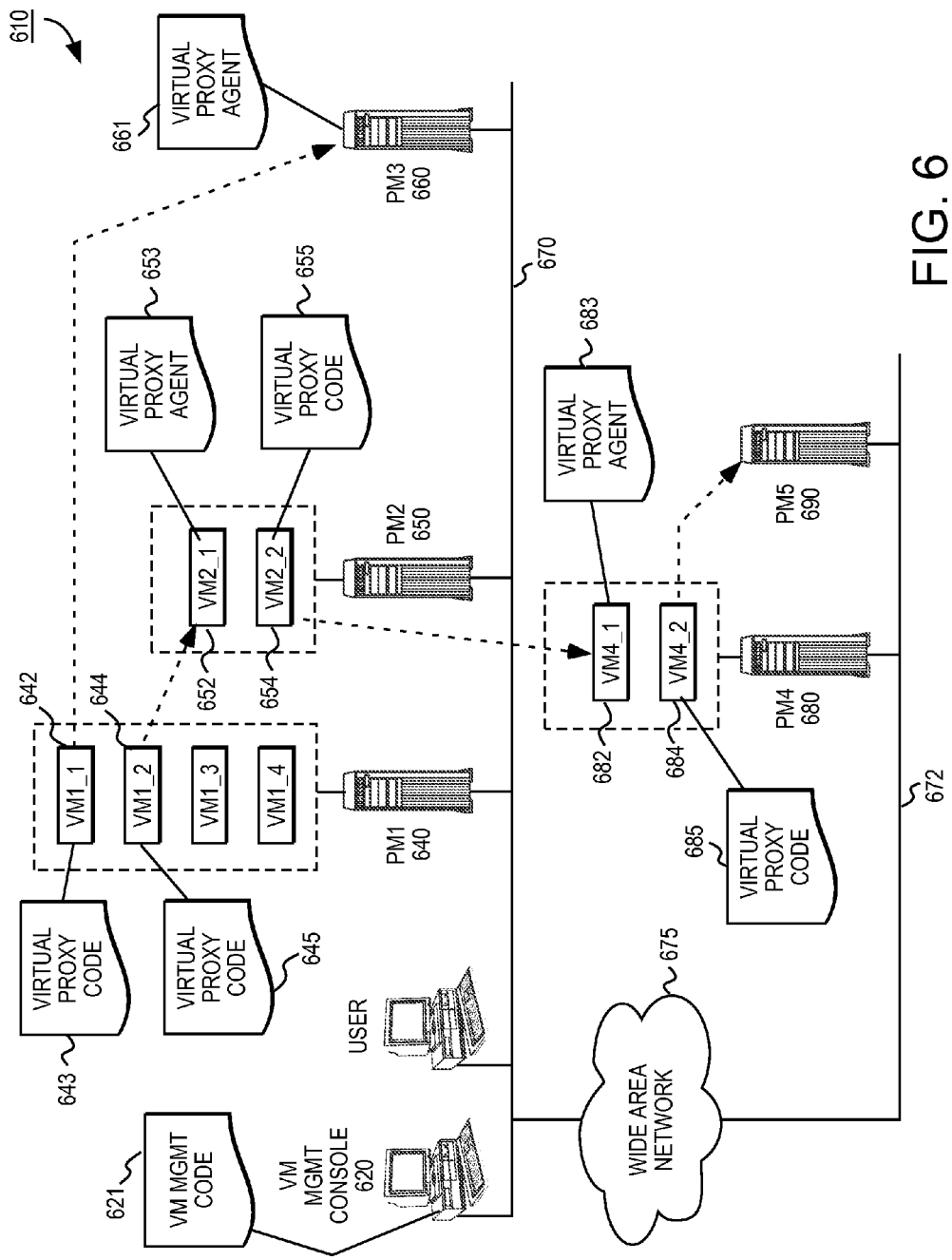
FIG. 6 illustrates one embodiment of a computer network including virtual proxies to support management of target machines by a virtual machine management tool.

FIG. 6 illustrates one embodiment of a heterogeneous network environment including virtual proxies for target machines. The network includes a plurality of physical machines and virtual machines distributed across two local networks 670, 672. A wide area network 675 coupling the two local networks enables communication between the networks.

Each virtual proxy 642, 644, 654, and 684 is a virtual machine configured as or processing executable instructions identified as virtual proxy code 643, 645, 655, and 685, respectively to implement a virtual proxy function. In various embodiments, the corresponding target machines 652, 660, 682, and 690 may have virtual proxy agents 653, 661, and 682. Depending upon the application and requests to be supported, a virtual proxy may perform proxy functions in an agentless manner. Thus one or more target machines may not require a virtual proxy agent. For example, a virtual proxy agent is not required for target machine 690 of virtual proxy 684.

The virtual proxy code is compatible with the processor instruction set and operating system utilized by its associated virtual machine. Each virtual proxy agent must likewise be compatible with the processor instruction set and operating system utilized by its associated target machine. The instruction set of physical machines such as 640, 642, 680 may be different from the instruction set of the virtual machines used as proxies. Similarly, the instruction sets of virtual machines 652, 682 used as targets may be different from that of the physical machines 650, 680 hosting such virtual machines.

The virtual proxy code provides the proxy functionality. The proxy functionality includes intercepting requests for the target machine, facilitating action on the request by either the virtual proxy or the target machine, and then returning a response to the requester. More than one instance of virtual proxy code can be executing on a virtual machine to enable the virtual machine to support multiple virtual proxies and thus multiple target machines.

In cases where the request needs to be transformed for action by the target machine, in various embodiments the transformation can be performed by the virtual proxy code, the virtual proxy agent, or as a result of co-operation between the virtual proxy code and virtual proxy agent (i.e., some transformation is handled by each component). In any of these cases once the transformed request is prepared, the virtual proxy agent on the target machine ensures that the transformed request is acted upon by the target machine and then forwards any response back to the virtual proxy.

The virtual machine management tool is embodied as virtual machine management code 621 executing on a virtual machine management console 620. The virtual machine management tool permits the creation, deletion, configuration, and management of virtual machines hosted by physical machines on the local networks.

In order to prevent interaction with machines other than the associated virtual proxy or perhaps a management console, the virtual proxy agent may incorporate packet-filtering software. Such packet-filtering software can be configured to accept network requests only from specific network addresses or only of specific network request types, namely network requests from virtual proxies or network requests being used to configure virtual proxy agents. Such a feature ensures that the target machine is "invisible" to other networked machines. With the protection of packet-filtering software, the target machine can be enabled for configuration over-the-network. The virtual machine management tool can thus perform system configuration of the virtual proxy agent on the target machine.

Basic system configuration requests are typically associated with tasks such as the following: i) creating a virtual machine on a specified host (create), ii) creating a copy of an existing virtual machine on the same or a different host (clone), iii) moving a virtual machine between hosts, iv) starting a virtual machine that is "off" or hibernating, v) shutdown of a virtual machine, vi) hibernating a virtual machine, vii) reconfiguration of a virtual machine to change processor, memory, disk space, emulated peripherals, etc., viii) taking a "snapshot" of a virtual machine (i.e., making a record of the state of the machine including memory, settings, and disk or other peripheral state), ix) restoring the virtual machine to a restore point as defined by a snapshot, x) deleting a snapshot, and xi) restarting or rebooting a virtual machine that is running.

More advanced system configuration requests typically address more sophisticated management objectives such as i) configuring multiple virtual machines for load balancing purposes, ii) configuring virtual machines to achieve high availability or disaster recovery, iii) performing a specific sequence of basic system configuration requests to optimize a particular objective. For example, more advanced system configuration requests may move virtual machines among different physical hosts to minimize operational costs that are dynamically varying.

In addition to the basic and advanced system configuration requests as described above, there are additional system configuration operations that the virtual machine management tool may be utilized to accomplish including: i) installing software on the virtual machine, ii) upgrading software on the virtual machine, iii) uninstalling software previously installed on the virtual machine, iv) updating the "firmware" of the virtual machine, and v) modifying a file system of the operating system on the virtual machine.

The introduction of the virtual proxy enables synthesis of apparent compatibility between the virtual machine management tool and the target machine to facilitate the use of a common management tool for the system as a whole. In particular, the introduction of virtual proxies enables the use of a common management tool in heterogeneous environment that consists of a mix of machines that are compatible and incompatible with the virtual machine management tool.

In the preceding detailed description, the invention is described with reference to specific exemplary embodiments thereof. Various modifications and changes may be made thereto without departing from the broader scope of the invention as set forth in the claims. The specification and drawings are, accordingly, to be regarded in an illustrative rather than a restrictive sense.

What is claimed is:

1. A computer system apparatus, comprising:
   a) a first virtual machine hosted by a first physical machine;
   b) a virtual proxy executing on the first virtual machine;
   c) a target machine communicatively coupled to the first virtual machine, wherein the target machine is a second physical machine, wherein the virtual proxy executing on the first virtual machine serves as the virtual proxy for the target machine;
   d) a virtual machine management tool; and
   e) the virtual proxy enables management of a virtual machine of the target machine by the virtual machine management tool in heterogeneous environments that are not compatible with the virtual machine management tool.

2. The apparatus of claim 1 further comprising:
   the virtual proxy code executing on the first virtual machine, wherein the virtual proxy contains code that determines whether to communicate a request from a requester to the target machine.

3. The apparatus of claim 2, wherein the first virtual machine communicates a response to the requester without communicating the request to the target machine.

4. The apparatus of claim 2 wherein the first virtual machine forwards the request to the target machine for execution.

5. The apparatus of claim 4 wherein the target machine transforms the request into a target machine compatible request prior to execution on the target machine.

6. The apparatus of claim 4 wherein upon receipt of a response from the target machine, the first virtual machine forwards the response to the requester.

7. The apparatus of claim 6 wherein the virtual proxy caches the response as a cached response.

8. The apparatus of claim 7 wherein in response to a subsequent request, the virtual proxy responds with the cached response.

9. The apparatus of claim 2 wherein the virtual proxy transforms the request into a target machine compatible request prior to communication to the target machine.

10. The apparatus of claim 2 where the request is a system configuration request.

11. The apparatus of claim 1 wherein the target machine includes packet-filtering software to allow the target machine to communicate only with the first virtual machine.

12. The apparatus of claim 1 wherein the first virtual machine serves as the virtual proxy for each of a plurality of target machines.

13. The apparatus of claim 1 wherein the target machine is executing a virtual proxy agent.

14. The apparatus of claim 1 wherein the target machine is a second virtual machine.

15. The apparatus of claim 14 wherein the second virtual machine is hosted by a second physical machine.

16. The apparatus of claim 15 wherein the second virtual machine is hosted by the first physical machine.

* * * * *